United States Patent [19]

Lis

[11] Patent Number: 5,404,222

[45] Date of Patent: Apr. 4, 1995

[54] INTERFEROMETRIC MEASURING SYSTEM WITH AIR TURBULENCE COMPENSATION

[75] Inventor: Steven A. Lis, Needham, Mass.

[73] Assignee: Sparta, Inc., Lexington, Mass.

[21] Appl. No.: 181,885

[22] Filed: Jan. 14, 1994

[51] Int. Cl.⁶ .............................................. G01B 9/02
[52] U.S. Cl. .................................. 356/349; 356/351; 356/358
[58] Field of Search ................ 356/349, 351, 358, 357, 356/4.5

[56] References Cited

U.S. PATENT DOCUMENTS

| | | | |
|---|---|---|---|
| 3,458,259 | 7/1969 | Bagley et al. | 356/106 |
| 3,656,853 | 4/1972 | Bagley et al. | 356/106 |
| 3,788,746 | 1/1974 | Baldwin et al. | 356/106 |
| 3,790,284 | 2/1974 | Baldwin | 356/106 |
| 3,877,813 | 4/1975 | Hayes et al. | 356/349 |
| 4,072,422 | 2/1978 | Tanaka et al. | 356/106 |
| 4,215,938 | 8/1980 | Farrand et al. | 356/351 |
| 4,295,741 | 10/1981 | Palma et al. | 356/349 |
| 4,465,372 | 8/1984 | Geary | 356/359 |
| 4,594,003 | 6/1986 | Sommargren | 356/349 |
| 4,632,554 | 12/1986 | Pearce | 356/349 |
| 4,684,828 | 8/1987 | Sommargren | 307/425 |
| 4,688,940 | 8/1987 | Sommargren et al. | 356/349 |
| 4,693,605 | 9/1987 | Sommargren | 356/349 |
| 4,711,574 | 12/1987 | Baldwin | 356/349 |
| 4,717,250 | 1/1988 | Sommargren | 356/349 |
| 4,733,967 | 3/1988 | Sommargren | 356/361 |
| 4,746,216 | 5/1988 | Sommargren | 356/349 |
| 4,752,133 | 6/1988 | Sommargren | 356/349 |
| 4,784,489 | 11/1988 | Cutler et al. | 356/349 |
| 4,784,490 | 11/1988 | Wayne | 356/351 |
| 4,787,747 | 11/1988 | Sommargren et al. | 356/349 |
| 4,802,764 | 2/1989 | Young et al. | 356/349 |
| 4,802,765 | 2/1989 | Young et al. | 356/349 |
| 4,807,997 | 2/1989 | Sommargren | 356/349 |
| 4,832,489 | 5/1989 | Wyant et al. | 356/359 |
| 4,859,066 | 8/1989 | Sommargren | 356/349 |
| 4,881,815 | 11/1989 | Sommargren | 356/349 |
| 4,881,816 | 11/1989 | Zanoni | 356/349 |
| 4,883,357 | 11/1989 | Zanoni et al. | 356/349 |
| 4,886,363 | 12/1989 | Jungquist | 356/349 |
| 4,906,095 | 3/1990 | Johnston | 356/349 |
| 4,907,886 | 3/1990 | Dandliker | 356/349 |
| 4,930,894 | 6/1990 | Baldwin | 356/351 |
| 4,948,254 | 8/1990 | Ishida | 356/358 |
| 4,950,078 | 8/1990 | Sommargren | 356/349 |
| 4,969,017 | 11/1990 | Lefevre et al. | 356/350 |
| 4,984,898 | 1/1991 | Höfler et al. | 356/358 |
| 5,004,914 | 4/1991 | Vali et al. | 298/227.27 |
| 5,127,735 | 7/1992 | Pitt | 356/358 |
| 5,133,599 | 7/1992 | Sommargren | 356/349 |
| 5,146,284 | 9/1992 | Tabarelli et al. | 356/345 |
| 5,153,669 | 10/1992 | DeGroot | 356/349 |
| 5,172,185 | 12/1992 | Leuchs et al. | 356/358 |
| 5,172,186 | 12/1992 | Hosoe | 356/358 |
| 5,187,543 | 2/1993 | Ebert | 356/349 |
| 5,280,341 | 1/1994 | Nonnenmacher et al. | 356/358 |

OTHER PUBLICATIONS

Dukes et al. (1970) "A Two-Hundred-Food Yardstick with Graduations Every Microinch", *Hewlett-Packard J.*, 21:203-209.

Johnson et al. (1977) "Phase-Locked Interferometry", *Clever Optics, SPIE Proc.*, 126:152-160.

(List continued on next page.)

*Primary Examiner*—Samuel A. Turner
*Assistant Examiner*—Jason D. Eisenberg
*Attorney, Agent, or Firm*—Lahive & Cockfield

[57] ABSTRACT

An improved interferometric measuring system wherein the system projects a first beam of light at a first measurement wavelength along a reference path to a reference reflector and a second beam of light at a second measurement wavelength along a measurement path to a measurement reflector, and determines a change in position of the measurement reflector from an interference pattern produced between a first light beam reflected from the reference reflector and a second light beam reflected from the measurement reflector, and wherein the system can measure atmospheric disturbances along the measurement path, concurrently with measuring a change in the position of the measurement reflector.

23 Claims, 9 Drawing Sheets

OTHER PUBLICATIONS

Hopf et al. (1980) "Second-harmonic interferometers", *Optics Letters*, 5:487–489.

Baldwin et al. (Apr. 1983) "Laser Optical Components for Machine Tool and Other Calibrations", *Hewlett-Packard J.*, pp. 14–22.

Quenelle et al. (Apr. 1983) "A New Microcomputer-Controlled Laser Dimensional Measurement and Analysis System", *Hewlett–Packard J.*, pp. 3–13.

Siddall et al. (1987), Martinus Nijhoff publication *Optical Metrology (Coherent and Incoherent Optics for Metrology, Sensing and Control in Science, Industry and Biomedicine)* "Some Recent Developments in Laser Interferometry" (Olivério D. D. Soares, Porto, Portugal, eds.), published in cooperation with NATO Scientific Affairs Div., pp. 69–83.

INTERFEROMETRIC MEASURING SYSTEM WITH AIR TURBULENCE COMPENSATION

BACKGROUND OF THE INVENTION

This invention relates generally to interferometers. More particularly, it relates to methods and apparatus for compensating for the effects of atmospheric turbulence on interferometric measurements.

Interferometers typically can measure the change in position of a movable measurement mirror with respect to a second stationary reference mirror. To perform this measurement, a light source generates two beams of light, one of which is reflected from the reference mirror and one of which is reflected from the measurement mirror. The light reflected from the two mirrors is then combined. With the mirrors exactly aligned, the intensity of the combined beam periodically increases and decreases as the reflected light from the two paths alternately interferes constructively and destructively. Each half wavelength of mirror movement results in a total optical path change of one wavelength and thus, in one complete cycle of intensity change. If the wavelength of the generated light is known, then by counting the fringes in the interference patterns produced by the two light beams, the change in position of the moving mirror can be easily determined.

Alternatively, the interferometer can employ a heterodyne laser source. As used herein, the term "heterodyne laser" refers to a laser that produces at least two beams of light closely spaced in frequency (e.g., having a frequency difference or beat frequency in the approximate range of 1–20 MHz.), and being orthogonally polarized. A polarizing beam splitter directs one of the beams along the measurement path to the measurement mirror and one of the beams along the reference path to the reference mirror. A heterodyne sensor combines the light reflected from the two mirrors and detects the beat frequency. As long as the measurement mirror remains stationary, the beat frequency remains fixed. However, if the measurement mirror moves away, a predictable change in the beat frequency will result due to the Doppler effect. Changes in the number of frequency beats are directly related to the changes in position of the measurement reflector. Thus, the heterodyne interferometer can accurately measure a change in the measurement mirror's position relative to the reference mirror.

Over the last decade or so, interferometers have played an important role in integrated circuit fabrication. A principal tool used for mass production of integrated circuit chips is a lithographic stepper. During integrated circuit fabrication, a substrate is affixed to a movable stage. The lithographic stepper is the device which positions the stage underneath a high performance image projection system. Interferometers are used to sense the stage position and to control the stepper. Consequently, as manufactureres attempt to reduce the dimensions of the circuits being formed on substrates, and as registration tolerances are tightened, interferometers are required to provide more precise control for the stepper.

The precision with which interferometers can provide such position control has been significantly enhanced by technical advances in the design of various optical components, including lasers, and photosensors. However, the performance of interferometers is, nevertheless, limited by changes in optical path length due to atmospheric disturbances in the measurement and reference paths. Such atmospheric disturbances can be easily controlled with regard to the reference path by enclosing the portion of the interferometer which includes the reference mirror in a vacuum chamber. However, enclosing the entire system, including the movable measurement mirror, which is typically mounted on the stage assembly, in a vacuum chamber can be very expensive.

To solve this problem, prior art systems attempted to compensate for fluctuations in optical path length by using sensors which detect atmospheric fluctuations. However, such approaches have enjoyed only limited success because the sensors utilized can not be located directly in the measurement beam path, without affecting the quality of the principal measurement.

Accordingly, one object of the invention is to provide an improved interferometer having the capability of directly measuring changes in the optical path length resulting from atmospheric disturbances.

Another object of the present invention is to provide an improved interferometer that compensates for measurement errors resulting from temporally dependent atmospheric fluctuations along the optical beam path.

A further object of the invention is to provide an improved interferometer having the capability of directly measuring changes in optical path length resulting from atmospheric disturbances, concurrently with measuring a change in position of a movable measurement mirror with respect to a stationary reference mirror.

Other general and specific objects of the invention will in part be obvious and will in part appear hereinafter.

SUMMARY OF THE INVENTION

The foregoing objects are attained by the invention, which provides an improved interferometric measuring system for determining a change in position of a measurement reflector with respect to a reference reflector. According to a preferred embodiment, the system includes optical elements for projecting a reference beam of light along a reference path to the reference reflector. The system also includes optical elements for projecting a measuring beam of light along a measurement path to a measurement reflector. The system determines a first measurement of changes in the position of the measurement reflector with respect to the reference reflector from an interference pattern produced between a first light beam reflected from the reference reflector and second light beam reflected from the measurement reflector.

According to one embodiment of the invention, the improvement in the system comprises a laser source, a sensor, and an error compensation network. The laser source projects a first detection beam at a first detection wavelength and a second detection beam at a second detection wavelength along the measurement path. The sensor measures a phase difference between a first reflected detection beam from the measurement reflector due to the first detection beam and a second reflected detection beam from the measurement reflector due to the second detection beam. The difference in the phase angle between the two reflected beams is representative of the atmospheric disturbances along the measurement path. The error compensation network compensates for any errors in the interferometric measurements, which result from the detected atmospheric disturbances.

The optical elements which project the reference and measurement beams can include a heterodyne laser source. Thus, the reference beam and the measurement beam can be linearly polarized and orthogonal to each other. Additionally, the reference beam and the measurement beam can be closely spaced in frequency. In a further embodiment, the interferometric system can determine the change in position of the measurement reflector by determining a difference in the frequency between the first reflected light beam and the second reflected light beam.

The laser source of the improvement can also include a diode laser, other solid state lasers or gas lasers for generating the first detection beam. According to a preferred embodiment, the wavelength of the first detection beam is substantially different from both the wavelength of the measurement beam and the wavelength of the reference beam. The laser source of the improvement can also include a first wavelength shifter for shifting the wavelength of the first detection beam to generate the second detection beam. According to a further embodiment, the wavelength shifter can halve the wavelength of the first detection beam to generate the second detection beam.

The sensor can include a beam director, a second wavelength shifter, and a photosensitive detector. The beam director directs the first reflected detection beam along a first optical path to the second wavelength shifter. The beam director directs the second reflected detection beam along a second optical path to the photosensitive detector. The second wavelength shifter shifts the first detection wavelength to be substantially equal to the second detection wavelength. The photosensitive detector determines a difference in phase angle between the first reflected beam and the second reflected beam, subsequent to the first reflected beam being frequency shifted.

According to other embodiments of the invention, a variety of means and methods can be employed to improve an interferometric measuring system to measure atmospheric disturbances along both the reference and the measurement paths. By way of example, according to one embodiment, the interferometric system can project a first detection beam along the reference path and a second detection beam along the measurement path. The system can include a sensor for determining a second measurement of the change in position of the measurement reflector with respect to the reference reflector from the interference pattern produced between a light reflected from the reference reflector due to the first detection beam and light reflected from the measurement reflector due to the second detection beam. The system can also include a data processor for determining an error due to atmospheric disturbances by comparing the first measurement with the second measurement.

In this way, the invention provides an improved interferometric measuring system, which can detect errors resulting from atmospheric disturbances.

BRIEF DESCRIPTION OF THE DRAWINGS

For a better understanding of the nature and objects of the invention, reference should be made to the following detailed description and the accompanying drawings, in which.

DETAILED DESCRIPTION

Figure 1:
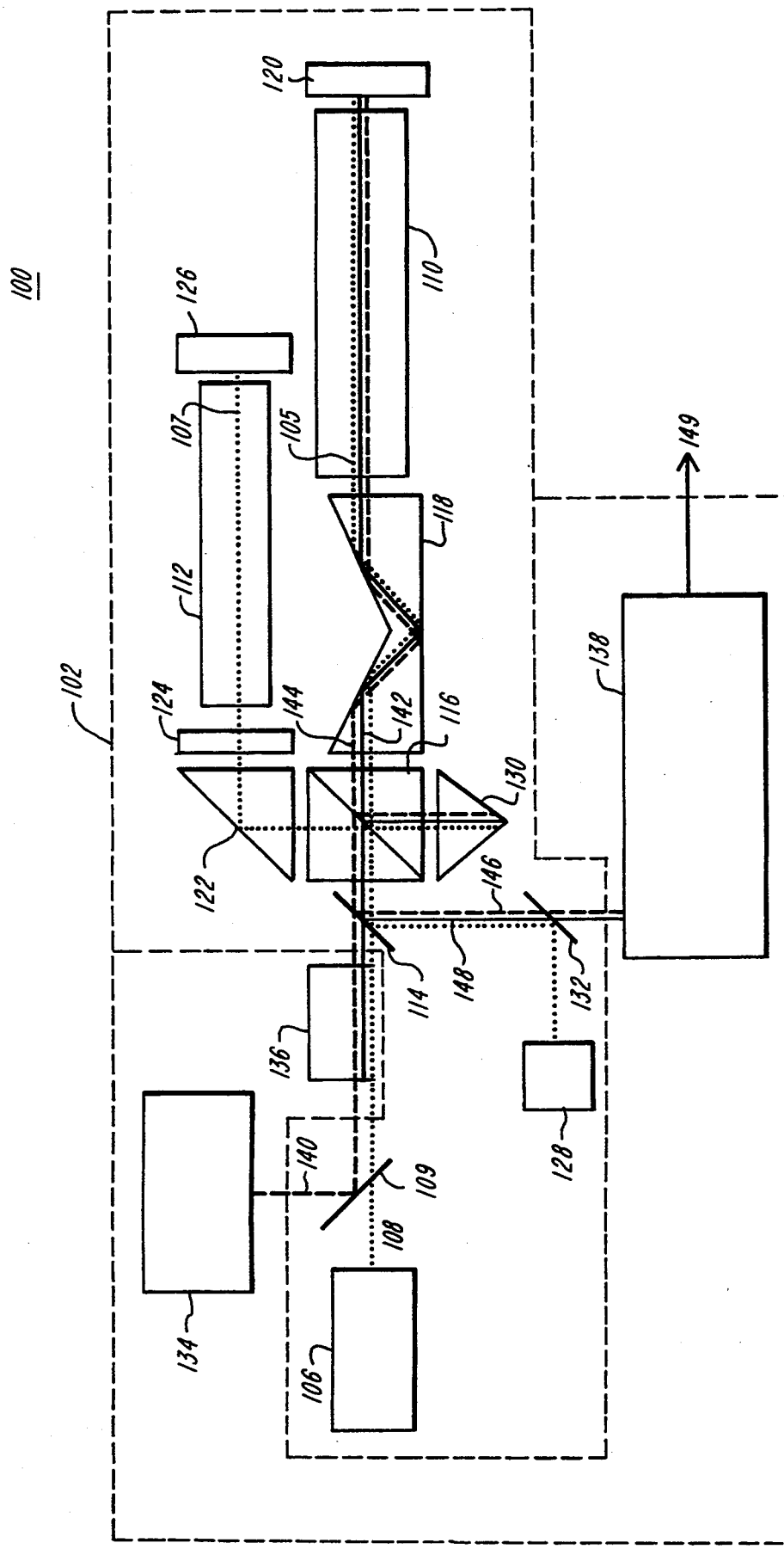
FIG. 1 is a schematic diagram depicting an interferometer incorporating an air turbulence compensated network which utilizes a second harmonic interferometric sensor.

FIG. 1 shows a schematic diagram of a heterodyne interferometer 100 incorporating a turbulence compensation network 104 according to one embodiment of the present invention. As FIG. 1 illustrates, the interferometer 100 can be functionally divided into a measurement network 102 and a compensation network 104. The measurement network 102 can measure changes in the position of the measurement mirror 120 relative to the fixed position of the reference mirror 126. The compensation network 104 can detect for changes in the length of the optical measurement path 110 which result from atmospheric disturbances along that path. According to one preferred embodiment, the position information from sensor 128 and the compensation information from sensor 138 can be coupled to, for example, a lithographic stepper position controller to enhance the performance of the controller.

The measurement network 102 includes a heterodyne laser source 106, along with the necessary optical elements to project a measurement beam along a measurement path 110, and to project a reference beam along a reference path 112. During operation, the heterodyne laser 106 projects the measurement beam 105 having a wavelength $\lambda_1$ (and correspondingly a frequency $f_2$) and the reference beam 107 having a wavelength $\lambda_2$ (and correspondingly a frequency $f_2$), past the mirror 114 to the polarization sensitive beam splitter 116. The beam splitter 116, being sensitive to the relative orthogonal polarization of the two beams projected from the laser 106 (i.e., whether the respective beam is S-polarized or P-polarized), directs the measurement beam 105 through the quarter wavelength rhomb 118 and along the measurement path 110 to the variable position measurement mirror 120. Similarly, the beam splitter 116 directs the reference beam 107 through the quarter wavelength plate 124 and along the reference beam path 112 to the fixed position reference mirror 126. According to the depicted embodiment, the heterodyne laser 106 initially polarizes the measurement beam 105 to be P-polarized. Similarly, the reference beam 107 is initially S-polarized. However in alternate configurations, alternate polarizations can be employed. The reference mirror 126 and the measurement mirror 120 reflect the reference beam 107 and the measurement beam 105, respectively, back to a heterodyne sensor 128. The sensor 128 combines the reflected measurement beam 105 and the reflected reference beam 107 and determines the beat frequency between the two beams. With the mirrors 126 and 120 exactly aligned, the beat frequency between the reflected measurement beam 105 and the reflected reference beam 107 (i.e., the difference in frequency between reflected beams 105 and 107) is exactly equal to the beat frequency of the heterodyne laser 106. However, as is well known, due to Doppler shifting, the beat frequency changes in response to the movement of the measurement mirror 120. Thus, the network 102 can provide an accurate measurement of the changes in position of the measurement mirror 120, relative to the reference mirror 126. To further enhance the accuracy of the network 102, a second heterodyne sensor (not shown) can be included to measure the beat frequency between beams 105 and 107, prior to those beams being coupled to beam splitter 116. This beat frequency measurement can be used as a reference point to correct for any frequency fluctuations in the heterodyne laser 106.

As one skilled in the art will appreciate, the effects of the Doppler shift can be amplified by repeatedly reflecting the measurement beam 105 along the measurement path 110 and/or by repeatedly reflecting the reference beam 107 along the reference path 112. To provide this feature, the measurement network 102 can include the corner cube 130.

Figure 2:
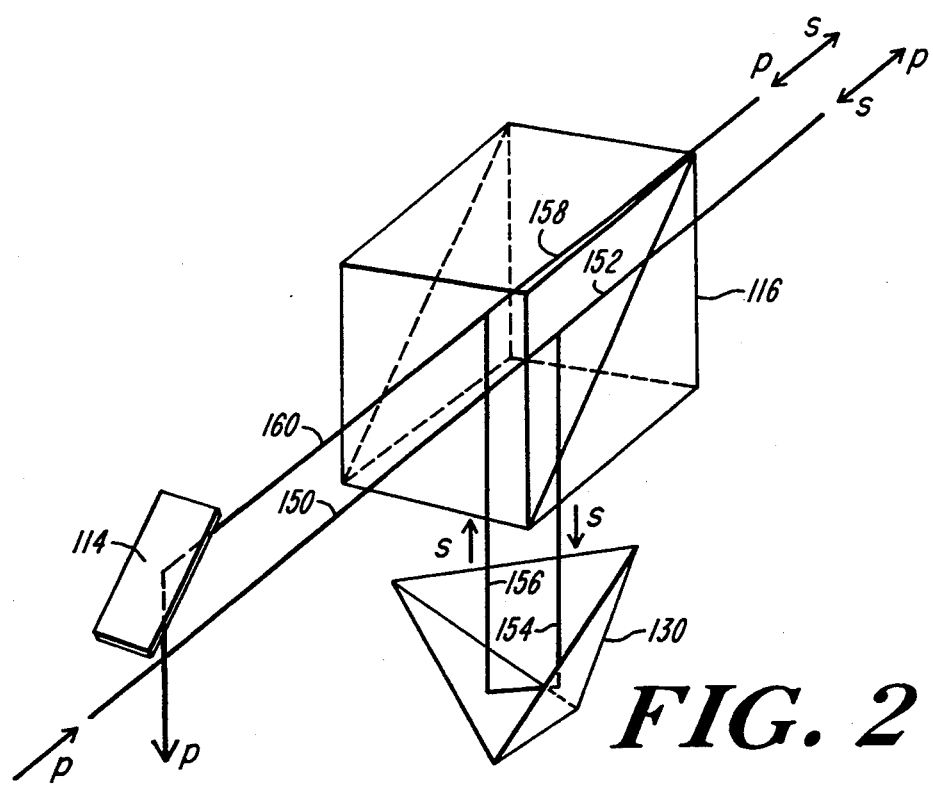
FIG. 2 is a perspective view showing a corner cube and a polarization sensitive beam splitter of the type depicted in FIG. 1.

FIG. 2 shows a perspective view of an optical configuration which employs a corner cube to enable the measurement beam 105 to traverse the measurement path multiple times, prior to being combined with the reflected reference beam 107. The P and S notations in FIG. 2 indicate the polarization of the measurement beam 105 along the various optical paths shown. Initially the collinear S and P beams pass by the mirror 114 on their way to the polarization beam splitter 116 along path 150. The beam splitter 116 directs the P-polarized measurement beam 105 to the measurement mirror 120 along path 152 through the quarter wavelength rhomb 118. As the beam 105 passes through the rhomb 118, the rhomb 118 rotates the beam 105 to have circular polarization. The measurement mirror 120 then reflects the beam 105 along path 152 back through the rhomb 118 giving it S-polarization. However, in doing so, the measurement mirror 120 rotates the polarization of the reflected beam 105 to be once again P-polarized. Next, the rhomb 118 rotates the beam 105 to have an S-polarization. Thus, each time the beam 105 passes from the beam splitter 116 to the mirror 120 and back, the rhomb 118 and the mirror 120 operate to rotate its polarization.

The beam splitter 116, in response to the S-polarization, directs the reflected measurement beam 105 along path 154 into the corner cube 130. The corner cube 130, in turn reflects the measurement beam 105 back to the beam splitter 116 along path 156. As shown, path 154 is substantially parallel to path 156. In response to the measurement beam along path 156 being S-polarized, the beam splitter 116 directs the measurement beam 105 back to the measurement mirror 120, along path 158. Once again, the reference mirror 120 reflects the measurement beam 105 and the rhomb 118 and mirror 120 operate in concert to rotate its polarization. The reflected beam 120, now having a P-polarization, couples back along path 158. In response to the beam 105 being P-polarized, the beam splitter 116 couples the measurement beam 105 back to the mirror 114 along path 160. In this way, the illustrated measurement beam traverses the measurement path two times, prior to being combined with the reflected reference beam 107.

Heterodyne interferometric measurement networks of the type depicted in FIG. 1 at 102 are well known in the art. For a fuller discussion of such networks, reference should be made to U.S. Pat. Nos. 3,790,284 and 4,883,357, the teachings of which are incorporated herein by reference.

As one skilled in the art will appreciate, the optical components included in the network 102 can be selected to provide high performance at the wavelengths of the heterodyne beam 108 and concurrently at the wavelengths of the detection beams 142 and 144. By way of example, transmissive materials can be employed, which permit efficient transmission at all the wavelengths in question. Additionally, the quarter wavelength plate 124 and the quarter wavelength rhomb 118 should provide accurate phase delay at all the wavelengths used, although the accuracy of the phase delay need not be the same at all the wavelengths. To accomplish this, beam splitters made of calcite which provide accurate separation of light beams over a wide range of wavelengths due to their polarization properties, can be employed. Similarly, quarter wavelength rhombs provide achromatic wave retardation, and specially designed quarter wavelength plates which are also achromatic in nature can be used.

Figure 3:
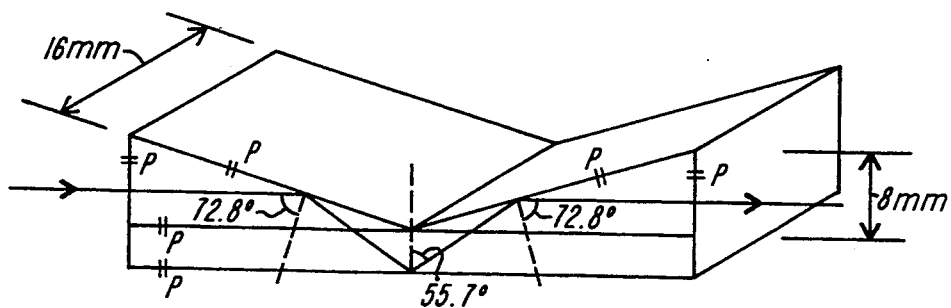
FIG. 3 shows a schematic diagram of an exemplary custom quarter wavelength rhomb of the type depicted in FIG. 1.
Figure 4:
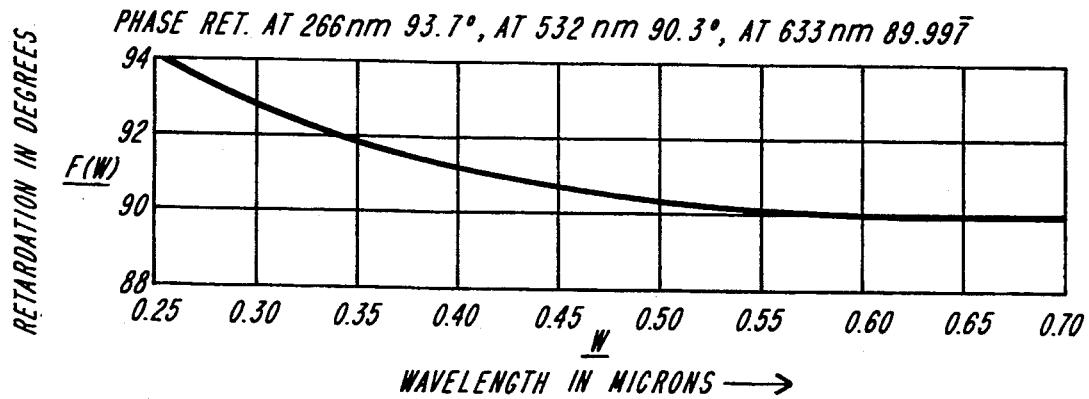
FIG. 4 is a graphical representation of the phase retardation versus wavelength characteristics for the rhomb depicted in FIG. 3.

The components utilized in the measurement network 102 are well known in the art. By way of example, the heterodyne laser 106 can be a model #5517B laser head, and the heterodyne sensor 128 can be a model #10780F receiver, both available from Hewlett-Packard Company. The beam splitter 116 can be a model #MGTYB20 UV Polarizer, available from Karl Lambrecht Company. The reflectors 122 and 130 can be a model #01 PQA 002 Right Angle Prism; and a model #CCH 007 retroreflector, respectively; both available from Melles Griot Company. The quarter wavelength plate 124 can be a model #WPQC4-12-V, also available from Karl Lambrecht. The quarter wavelength rhomb 118 can be a custom designed quarter wavelength plate of the type shown schematically in FIG. 3, also available from Karl Lambrecht Company. The phase retardation versus wavelength characteristic of rhomb 118 is plotted in FIG. 4.

Typically, in the measurement network 102, the reference beam path 112 can be environmentally controlled, for example, by enclosing that path in a vacuum chamber. However, as previously discussed, the measurement path 110 can not be as easily controlled, and thus, the time varying dispersive properties of the measurement path 110 can introduce a source of error into the interferometer. To account for and minimize the errors caused by the time varying dispersive nature of the medium along the measurement path 110, the interferometer 100 includes the compensation network 104.

It is well known that the time varying dispersive properties of a beam path result in a change in the refractive index n along the path. It is also well known that the refractive index of a medium varies in a predictable manner in dependence on the wavelength λ of the beam propagating through the medium. The change in refractive index with wavelength for air can be expressed by the Cauchy relationship.

Figure 5:
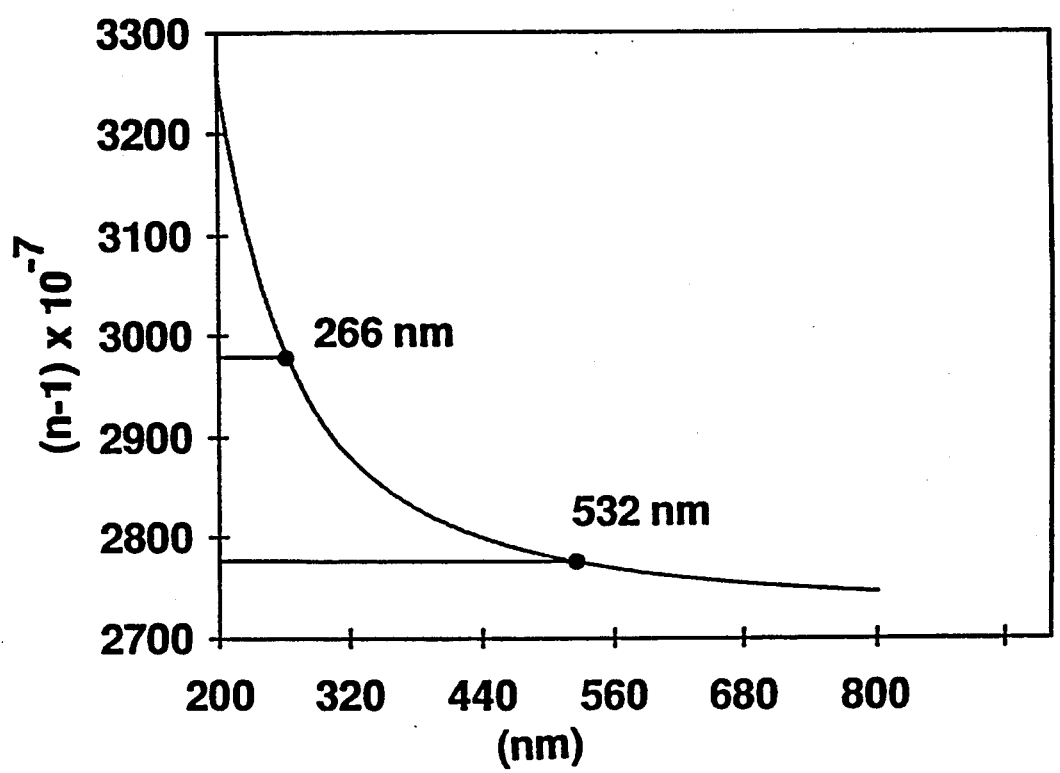
FIG. 5 is a graph depicting the relationship between the wavelength of light and the index of refraction of air.

FIG. 5 graphically illustrates the Cauchy relationship for air(i.e., the index of refraction of air versus wavelength). As shown in FIG. 5, for a light beam having a wavelength of 266 nm, the index of refraction of air is approximately $1.0 + 2971 \times 10^{-7}$. In the same way, for a light beam having a wavelength of 532 nm, the index of refraction of air is approximately $1.0 + 2774 \times 10^{-7}$. Because the path length l, varies proportionally with n which in turn changes with λ, as explained above, l will vary with λ according to:

$$l(\lambda,\rho) = l_o + [n(\lambda,\rho) - 1]l_o$$

where $l_o$ is the path length measured in a vacuum, λ is the wavelength, n is the index of refraction of air, and ρ is the air density. Thus, over a 20 cm path in air, the approximate difference of $2.0 \times 10^{-5}$ in the refractive index of air seen by a beam having a wavelength of 266 nm and a beam having a wavelength of 532 nm, creates a path length difference of 4 μm.

Additionally, small air turbulences, due to thermal non-uniformities in the local environment and due to air flow irregularities, can alter the local density of air ρ. As FIG. 5 illustrates, for a beam having a wavelength of 532 nm, a 0.1% change in ρ results in a fluctuation in the refractive index of air of approximately $2.6 \times 10^{-7}$. Thus, over a 20 cm path for a single wavelength measurement, the fluctuation would be approximately $\Delta n l_o = 52$ nm. As shown in FIG. 5, there is approximately a $2.0 \times 10^{-5}$ difference in the refractive index of air seen by a beam having a wavelength of 266 nm versus a beam having a wavelength of 532 nm. Thus, over a 20 cm turbulent path in air, density fluctuations of 0.1% can create an additional path length difference of 4 nm between a beam having a wavelength of 266 nm and a beam having a wavelength of 532 nm. Since the relationship between refractive index and wavelength is known, if both laser beams traverse the same optical path, one can factor out the changes in optical path length due to atmospheric disturbances. This permits a direct and rapid measurement of the change in the optical path length resulting from the atmospheric effects. According to the invention, network 104 exploits the Cauchy relationship to measure the effects of any atmospheric disturbance along path 110, concurrently with network 102 measuring changes in the position of mirror 120. The compensation network 104 includes a laser source 134, (e.g., a diode pumped double YAG laser) a frequency doubler 136, and a sensor 138. The outlet 149 from the sensor 138 can be coupled to a stage drive motor as shown at 124 in FIG. 10.

During operation, the laser source 134 provides a single polarized laser beam 140, which is separated in wavelength from the heterodyne beam 108. The beam splitter 109 reflects the beam 140 to the frequency doubler 136. The frequency doubler 136, constructed from a nonlinear optical material such as potassium dihydrogen phosphate or ammonium dihydrogen phosphate, doubles the frequency of the beam 140, and passes both the doubled detection beam 142 and undoubled detection beam 144 to the polarization sensitive beam splitter 116 past the mirror 114. For increased accuracy, the heterodyne laser beam 108 can pass through the frequency doubler 136 along with the laser beam 140.

The beam splitter 116 couples both detection beams, 142 and 144, to the variable position measurement mirror 120 by way of the quarter wavelength rhomb 118 and the measurement beam path 110. As in the case of the measurement beam 105, the corner cube reflector 130 can operate in combination with the beam splitter 116 to cause beams 142 and 144 to be reflected multiple times between the beam splitter 116 and the mirror 120. Following a predetermined number of passes along the measurement path 110, the beam splitter 116 couples the reflected detection beams 146 and 148 to the sensor 138 by way of the mirrors 114 and 132.

According to one preferred embodiment, the sensor 138 is a second harmonic interferometric sensor. The sensor 138 determines the effects of atmospheric disturbances along path 110 by measuring the phase difference between the reflected detections beams 146 and 148. In a vacuum, since beams 146 and 148 travel along identical optical paths, once the frequency of beam 146 is doubled to match the frequency of beam 148, these two signals should be in phase. However, as predicted by the Cauchy Relationship, signals of differing wavelengths exhibit different dispersion characteristics when propagating through a particular medium. In other words, the refractive index of a particular medium varies according to the frequency of the particular signal which traverses that medium. Additionally, the refractive index of a particular medium also varies with atmospheric conditions such as temperature, pressure, and humidity.

Since beams 146 and 148 propagate through air, they should be out of phase by a predictable amount, after the frequency of beam 146 is doubled. However, if atmospheric disturbances are present along the measurement path, beams 146 and 148 will experience an additional difference in their respective indices of refraction and thus, an additional phase difference. Since, the index of refraction of a particular medium, such as air, varies in a known fashion with the wavelength of the propagating waveform, the second harmonic interferometer can determine the effect of the atmospheric disturbances from the phase difference between beams 146 and 148.

Figure 6:
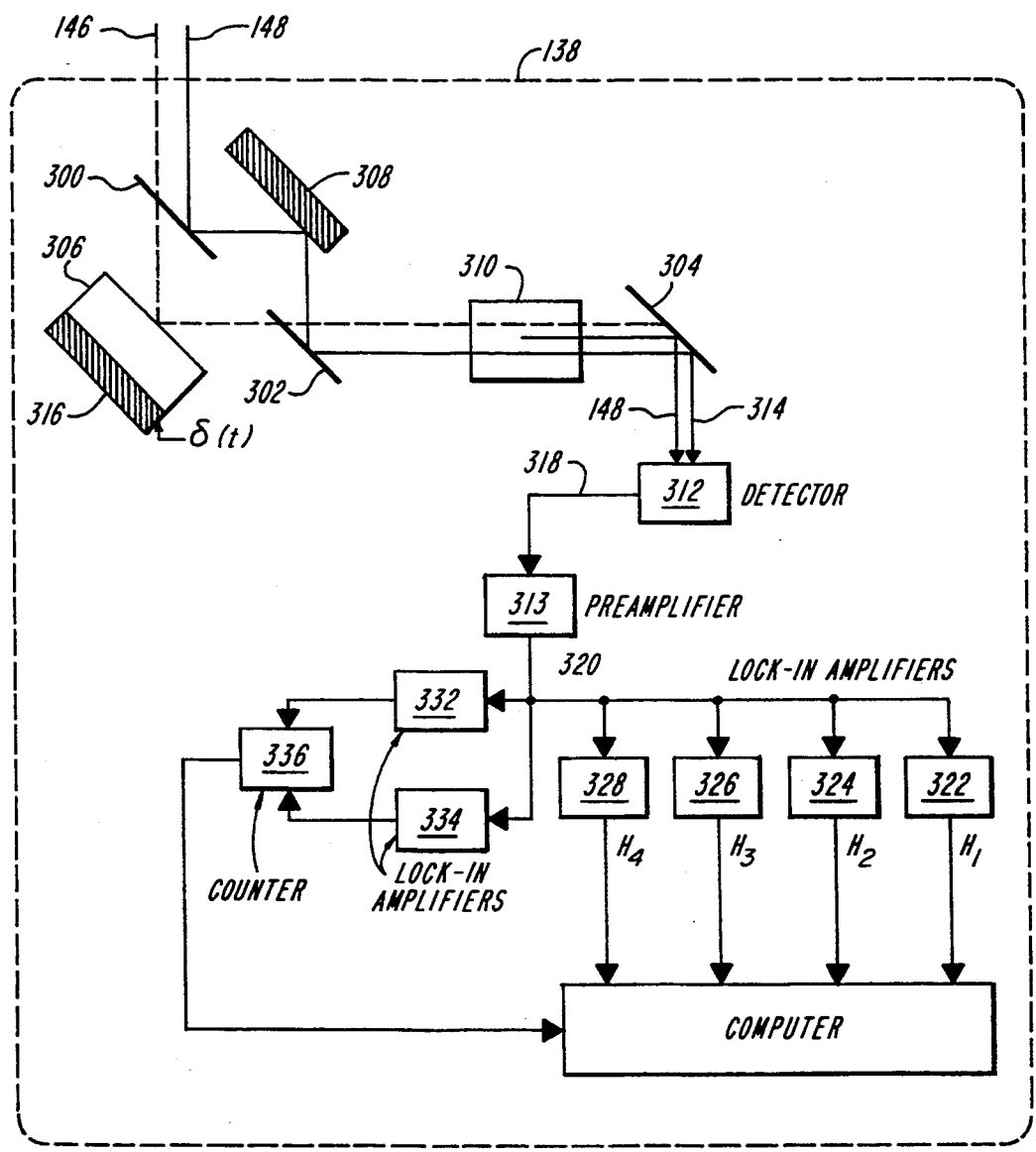
FIG. 6 is a detailed block diagram of the second harmonic interferometric sensor of FIG. 1.

FIG. 6 shows a more detailed block diagram of the second harmonic interferometric sensor 138 of FIG. 1. During operation, the doubled reflected detection beam 148 and the undoubled reflected detection beam 146 are separated by the beam splitter 300, which reflects the beam 148 to the mirror 308 and passes the beam 146 to the mirror 306. The mirror 306 reflects the beam 146 to the frequency doubler 310 by way of the beam splitter 302. The frequency doubler 310 shifts the frequency of the beam 146 so that this frequency will be substantially equal to the frequency of the beam 148 and then couples the shifted beam 314 to the detector 312. The mirror 308 couples the beam 148 via the beam splitter 302, the frequency doubler 310, and the beam splitter 304 to the detector 312. The detector 312 recombines the beams 148 and 314 and generates an interference signal 318 indicative of the phase difference between beams 148 and 314 and thus, representative of the error in the interferometric measurement due to atmospheric disturbances in the measurement path 110.

The piezoelectric modulator 316 (PZT) can be used to make fine adjustments to the optical path length traversed by beam 148. By way of example, the PZT can be driven by a small DC voltage (e.g., 100 V) to bring the beams 148 and 314 into phase. At the point where beams 148 and 314 are in phase, the interference signal 318 is maximized. As small changes in the air density along the measurement path 110 occur, the phase of the two beams 314 and 148 changes. As the beams 314 and 148 move out of phase, the intensity of signal 318 diminishes. According to one embodiment, signal 318 can be fed back to control the DC drive voltage to the PZT 316 so that the PZT 316 maintains the signal 318 at a maximum. The DC signal required to maintain beams 148 and 318 in phase is related to the phase difference between the two signals 148 and 314, and therefore, provides an accurate measurement of the change in the optical length of the measurement path 110 due to atmospheric disturbances.

In a further embodiment, the PZT 316 can be driven with a sinusoidal signal $\delta(t)$ to temporally phase shift the beam 146. In this case, the light from beams 148 and 314 are interfered and then coupled to the detector 312, such as a model #UV100BG, available from, EG&G Optoelectronics of Canada, and the electrical output signal 318 is amplified by a standard amplifier 313, such as a model 5113, available from EG&G Princeton Applied Research.

The time varying intensity of the buffered interference signal 320 is then given by:

$$I(t) = I_1 + I_2 + 2\sqrt{I_1 I_2}\,\cos(\phi + \delta(t))$$

where $I_1$ and $I_2$ are the irradiances from the two beams 148 and 314, respectively, $\phi$ is the phase difference between beams 148 and 314, and $\delta(t)$ is representative of the temporal phase shift of beam 148, induced by the PZT 316. If the temporal modulation is sinusoidal then:

$$\delta(t) = A\sin(\omega t)$$

where A is the amplitude of the temporal modulation. When the above two equations are combined, I(t) is given by:

$$I(t) = I_1 + I_2 + 2\sqrt{I_1 I_2}\,[\cos(\phi)\cos(A\sin(\omega t)) - \sin(\phi)\sin(A\sin(\omega t))].$$

The cosine of sine and the sine of sine can be expanded into an infinite series of Bessel functions so that:

$$I = I_1 + I_2 + 2\sqrt{I_1 I_2}\,[\cos(\phi)(J_0(A) + 2J_2(A)\cos(2\omega t) + \ldots) - \sin(\phi)(2J_1(A)\sin(\omega t) + 2J_3\sin(3\omega t) + \ldots)]$$

This equation represents the interference signal 320, which is composed of a series of harmonics of $\delta(t)$.

A lock-in amplifier, such as a model 5209, available from Princeton Applied research, can process a sinusoidal modulation to provide the amplitude of the modulation at a particular frequency. Thus, by coupling signal 320 into several such amplifiers 322, 324, and 326, $H_1, H_2$, and $H_3$ can be generated as follows:

$$H_1 = 2J_1(A)\sin(\phi);$$

$$H_2 = 2J_2(A)\sin(\phi);\text{ and}$$

$$H_3 = 2J_3(A)\sin(\phi)$$

where $H_1$, $H_2$, and $H_3$ are the first, second and third harmonics, respectively, of $\delta(t)$.

Combining the equations for the first and third harmonics, $\tan(\phi)$ is given by:

$$\tan(\phi) = \frac{\sin(\phi)}{\cos(\phi)} = \frac{H_1 J_2(A)}{H_2 J_1(A)}$$

and $\phi$ is given by:

$$\phi = \tan^{-1}\left(\frac{H_1 J_2(A)}{H_2 J_1(A)}\right)$$

If (A) is held constant, the Bessel functions are known values and the phase $\phi$ can be uniquely determined. Additionally, even if (A) is not held constant, but its range is limited, the value of (A) can be determined from the ratio of the first and the third harmonics or from the ratio of the second and the fourth harmonics. In this case:

$$\frac{H_1}{H_3} = \frac{J_1(A)}{J_3(A)} \text{ and } \frac{H_2}{H_4} = \frac{J_2(A)}{J_4(A)}$$

This allows (A) to be determined from a look-up table of ratios of Bessel functions. With (A) determined, the phase difference $\phi$ can be found by substituting into the above equations.

As discussed above, the effects of atmospheric disturbances on accurately positioning mirror 120 increase as the length of path 107 increases. More particularly, in the example of FIG. 6, the undoubled beam 144 has a wavelength 532 nm and the frequency doubled beam 142 has a wavelength of 266 nm. As shown in FIG. 5, the difference in the refractive index of air seen by a beam having a wavelength of 266 nm versus a beam having a wavelength of 532 nm is approximately $2.0 \times 10^{-5}$. If we assume a 20 cm length for path 110 and also that the system is a double pass system, then the actual length of path 110 becomes 80 cm. Over an 80 cm path in air the chromatic shift between beam 142 and 144 is then $l\Delta n = 16$ $\mu$m, which translates to approximately 64 wavelengths for the 266 nm beam of FIG. 6. Consequently, as mirror 120 moves and path 107 changes in length from 0 to 20 cm, the chromatic shift changes from 0 to approximately 64 wavelengths. Additionally, if we assume a 0.1% change in $\mu$ due to atmospheric disturbances, then over the 80 cm path there is an additional chromatic shift between beams 142 and 144 of 16 nm.

As one skilled in the art will appreciate, the approach discussed above with respect to FIG. 6 provides a very fine granularity measurement for determining the portion of the chromatic shift that is a fraction of one wavelength of beam 144. However, additional circuitry is needed to provide the coarse counting of whole wavelength shifts.

As beams 314 and 148 pass in and out of phase, the relative amplitudes of signals $H_1$ and $H_2$ wax and wane. Thus, according to one embodiment, the sensor 138 counts transitions from when the amplitude of $H_1$ is greater than $H_2$ to ones where it is less. In the case where the invention is operating with a lithographic stepper, this requires a sampling rate and a frequency of operation that is compatible with the rate of movement of the lithographic stage. In any case, the sampling rate must be fast enough to accommodate the maximum rate of change in the position of mirror 120.

In one prior art lithographic stepper system, the maximum allowable Doppler shift is 20 MHz, leading to a limiting stage speed of 3.15 m/sec in a double pass system. This results in the sensor 138 having to count 1008 wavelengths/second. The sampling rate should be several times this rate and the PZT modulation should be several times the sampling rate.

Consequently, as shown in FIG. 6, the sensor 138 further includes a second pair of lock-in amplifiers 332 and 334, and a counting network 336. Amplifiers 332 and 334 couple the signals $H_1$ and $H_2$, respectively, to the counting network 336. The counting network 336 samples $H_1$ and $H_2$ at 4 kHz, to monitor amplitude transitions between $H_1$ and $H_2$, thereby essentially counting interference fringes between beams 148 and 314.

According to a further embodiment, by oversampling, the network 336 can also determine the local slope as well as the relative amplitudes and thereby keep track of which direction the mirror 120 is moving.

As mentioned above, in one preferred application, the interferometer 100 can be used to control the position of a lithographic stepper. The air turbulence in such steppers have a time constant of the order of seconds, and thus, determining the phase change every 10 to 100 ms is sufficient. At such low sampling rates, 1/frequency noise in the sensor 138 can be a problem. However, a further advantage of the sinusoidal modulation, introduced by the PZT 316 is that by driving the PZT 316 at some arbitrary frequency, such as for example, 10 kHz, the 1/frequency noise can be substantially reduced.

To improve the accuracy of the sensor 138, an additional electronic detector can be used to sample the time varying fluctuations in the intensity of the beam 140, prior to being coupled to the frequency doubler 136. The information gained from this detector can be used to compensate for such fluctuations in real time, and thereby reduce the effective noise in the measurements due to fluctuations in the intensity of the source.

Like the optical components utilized in network 102, the components employed in the network 104 are also well known to those skilled in the art. Generally, the selection of the light source 134 is influenced by a number of factors, such as the stability of the laser intensity, the absolute value of the intensity, and the constancy of the absolute wavelength. Likewise, the remaining components are selected based on their ability to provide efficient separation, recombination, transmission, and polarization rotation of the light generated by the source 134. To this end, improvements in components are constantly being made and alternative designs to this invention are possible and practicable to those skilled in the art.

In one preferred embodiment, the network 104 employs a diode pumped doubled YAG laser 134, such as a model #DPY-425, available from Adlas, Inc. This recently developed all solid state laser provides output powers up to 400 mW, with the expectation that within a few years power levels will exceed 1 W. The 400 mW power level is sufficient so that the power loss in the frequency doubler 136 will not affect the accuracy of the interferometric measurement. Additionally, the output is highly plane polarized and need not exhibit the dual frequency characteristics of the HeNe laser 106. Alternatively, the laser 134 can be an Argon laser which is stabilized against frequency drift.

With regard to the frequency doubler 136, one such as that available from Quantum Technologies, Inc., can be employed. Such a frequency doubler utilizes carefully aligned crystals of ammonium dihydrogen phosphate (ADP) which are temperature controlled to provide the proper doubling efficiency. Additionally, those crystals are essentially transparent to all three wavelengths used and provide adequate doubling efficiency.

With regard to the beam directing optics and by way of further example, each of the three wavelength selective beam splitters 300, 302, and 304 can be a model #BSR-25-2037, available from CVI Laser Optics. In an alternative approach, the beam directing optical elements 300 and 302 can be polarization sensitive calcite beam splitters such as model #MGTYB8 from Karl Lambrecht Corp. To use these beam splitters for optimal separation of the beams one is required to insert a dual wavelength waveplate such as model #QWPD-532.0-2-266.0-1-10 from CVI Laser Corp. into the beam 146 and 148 before optical element 300. The two mirrors 306 and 308 can be a model #02-MLQ-001/016 and model #02-MLQ-001/028, respectively, both available from Melles Griot. The frequency doubler 310 can be of the ADP type. The piezoelectric modulator 314 can be a part #P-170.00, available from Physik Instruments.

As discussed above, the embodiment of FIG. 1 detects atmospheric disturbances in the measurement path 110 by measuring the phase difference between two beams 142 and 144, which results when beams 142 and 144 are simultaneously projected along the path 110. However, as is discussed below, according to other embodiments of the present invention, several other approaches can be employed to detect such disturbances.

Figure 7:
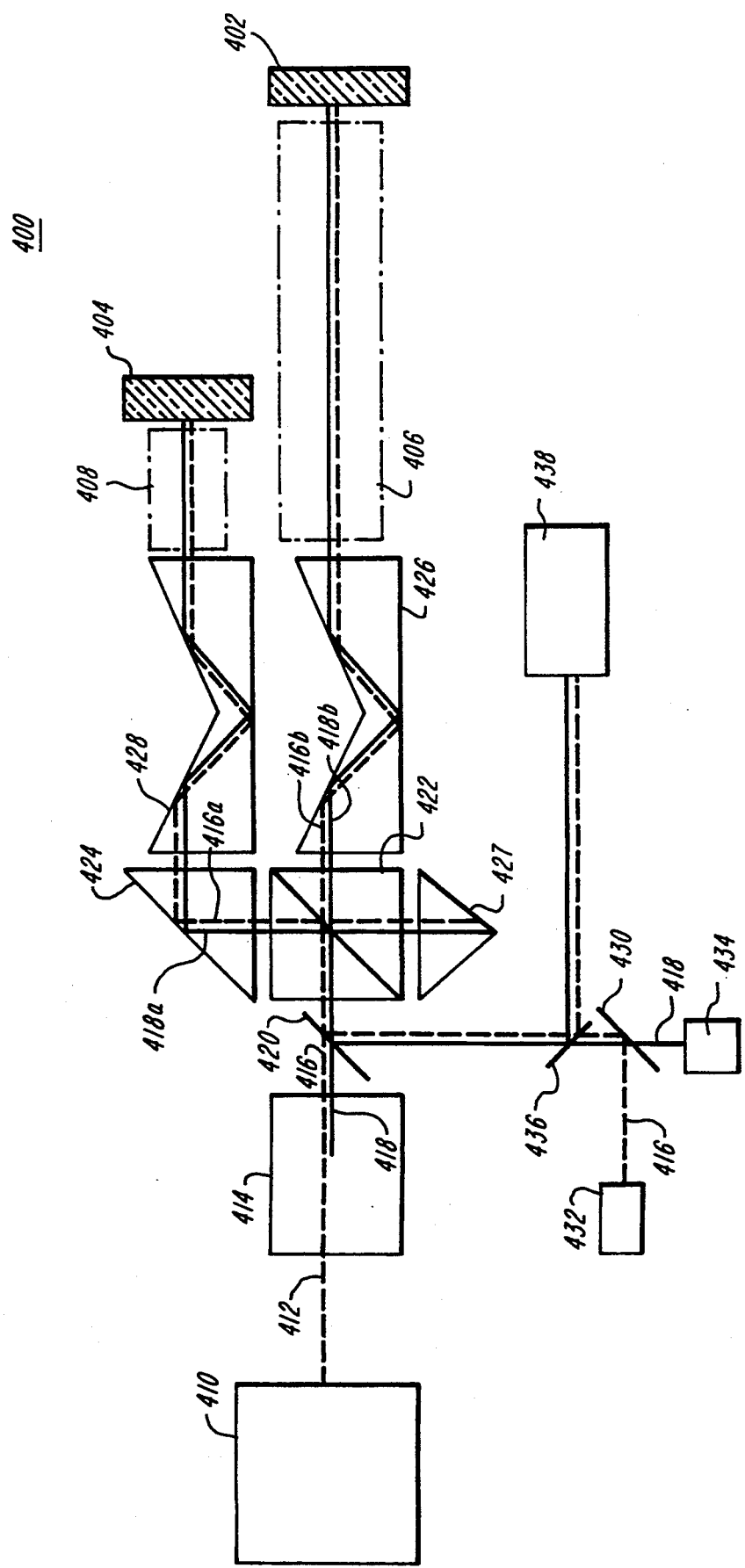
FIG. 7 is a schematic diagram depicting an interferometer incorporating an air turbulence compensation network which utilizes a single heterodyne laser source.

FIG. 7 is a schematic block diagram depicting an interferometer 400 which includes an alternate embodiment of the compensation network 104 of FIG. 1. As in the case of the system 100 of FIG. 1, the interferometer 400 can measure changes in the position of the measurement mirror 402 relative to the stationary reference mirror 404, while concurrently compensating for atmospheric turbulence along the measurement beam path 406. As explained in further detail below, the interferometer 400 can optionally include a sensor 438 to enable it also to compensate the atmospheric disturbances along the reference beam path 408. Thus, according to one embodiment of FIG. 7, neither the measurement path 406 nor the reference path 408 need be environmentally controlled.

Unlike the embodiment of FIG. 1, the interferometer 400 employs a single light source 410 which provides both the measurement beams and the atmospheric disturbance detection beams. According to one preferred embodiment, the light source 410 is a heterodyne light source comprising, for example, a diode pumped doubled YAG laser (DPDYAG). The light beams from such a source can also be frequency stabilized relative to a standard, such as iodine vapor, for further enhancement in stability. Alternatively, reference can be made to a fixed dimension stabilizing device.

The pair of heterodyne laser beams 412 generated by laser 410 are frequency doubled by the frequency doubler 414. Following frequency doubling, the two heterodyne beam pairs 416 and 418 pass through the interferometer system, traversing both the reference beam path 408 and the measurement beam path 406. More particularly, the mirror 420 coupled beam pairs 416 and 418 enter the polarization sensitive beam splitter 422.

The polarization sensitive beam splitter 422 directs one beam 416a of the undoubled heterodyne pair 416 to the reflector 424 and the other beam 416b of the undoubled pair 416 to the quaffer wavelength rhomb 426. Similarly, the beam splitter 422 directs one beam 418a, of the frequency doubled heterodyne pair 418, to the reflector 424, and the other beam 418b, of the frequency doubled pair 418, to the quaffer wavelength rhomb 426. The reflector 424 directs the beams 416a and 418a through the quaffer wavelength rhomb 428 and along the reference path 408 to the stationary reference mirror 404. Likewise, the beams 416b and 418b propagate through the rhomb 426 and along the measurement path 406 to the variable position mirror 402.

The undoubled heterodyne pair, beams 416a and 416b, reflect back along the reference and measurement paths, respectively, to the mirror 420 which reflects the pair of beams 416 to the dichroic beam splitter 430. The dichroic beam splitter 430 reflects the pair of beams 416 to the heterodyne sensor 432. The sensor 432 can determine the change in position of mirror 402 relative to the mirror 404 in the same fashion as sensor 128 of FIG. 1. Like the undoubled heterodyne pair 416, the doubled heterodyne pair 418, after traversing the same respective optical elements as the undoubled pair 416, passes through the dichroic beam splitter 430, where it is coupled to the frequency doubled heterodyne sensor 434. The sensor 434 can determine the relative change in position between mirror 402 and mirror 404 in the same manner as sensor 432. As in the network 102 of FIG. 1, the corner cube 427 can operate in conjunction with the polarization sensitive beam splitter 422 and the rhomb 426 to reflect the beams 416b and 418b along the measurement path 406 a predetermined number of times before coupling the reflected beams back to the mirror 420. As one skilled in the art will appreciate, the corner cube 427 and the beam splitter 422 can also operate in concert with rhomb 428 to reflect the beams 416a and 418a along the reference path 408 a predetermined number of times before coupling those beams back to the mirror 416.

If both the reference path 408 and the measurement path 406 are maintained in vacuum, the change in mirror position determined by sensors 432 and 434 would be the same. However, if one path is not evacuated or at least not environmentally controlled, comparison between the optical path lengths measured at the two widely separated frequencies of beams 416 and 418 can provide an accurate measurement of the fluctuations caused by the dispersion along the uncontrolled path. These fluctuations can then be subtracted out to provide an accurate measurement of the change in relative position between the two mirrors 402 and 404.

As mentioned above, the system 400 can optionally include a sensor 438, According to one embodiment, sensor 438 can be a second harmonic interferometric sensor, much like sensor 138 of FIG. 1. According to such an embodiment, the mirror 420 couples the reflected beam pairs 416 and 418 to a partially silvered mirror 436. The mirror 436 in turn couples the pairs 416 and 418 to the sensor 438. As in the case of the sensor 138, the sensor 438 can process the frequency doubled beam 418b and the undoubled beam 416b, which are reflected from the measurement path 406, to determine any atmospheric related path length fluctuations along that path. Alternatively, the sensor 438 can process the frequency doubled beam 418a and the undoubled beam 416a, which are reflected from the reference path 408 to determine any atmospheric related path length fluctuations along that path. Thus, an important advantage of this embodiment is that any time varying dispersion fluctuations present in either the measurement path or the reference path can be directly measured. In this way, the expense and technical complexity of atmospherically controlling either path can be avoided.

Figure 8:
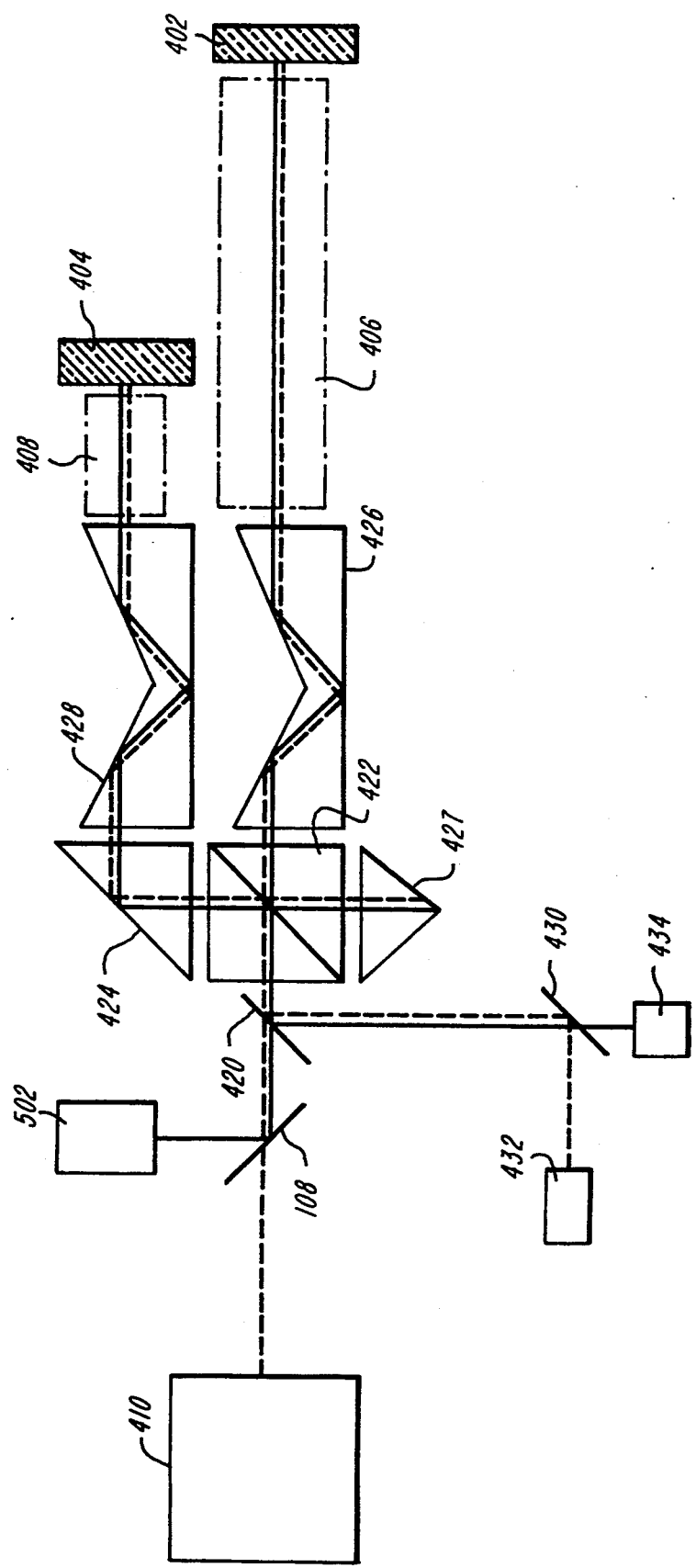
FIG. 8 is a schematic diagram depicting an interferometer incorporating an air turbulence compensation network which utilizes two heterodyne laser sources which are well separated in wavelength.

FIG. 8 is a schematic block diagram depicting an alternate embodiment 500 which utilizes an additional laser source 502 instead of the frequency doubler 414 of FIG. 7. The wavelengths provided by the second laser source 502 are well separated from those of the first laser 410. But for the substitution of the doubler 414 with the source 502, the operation of the interferometer 500 is virtually identical to the operation of the interferometer 400 of FIG. 7.

Figure 9:
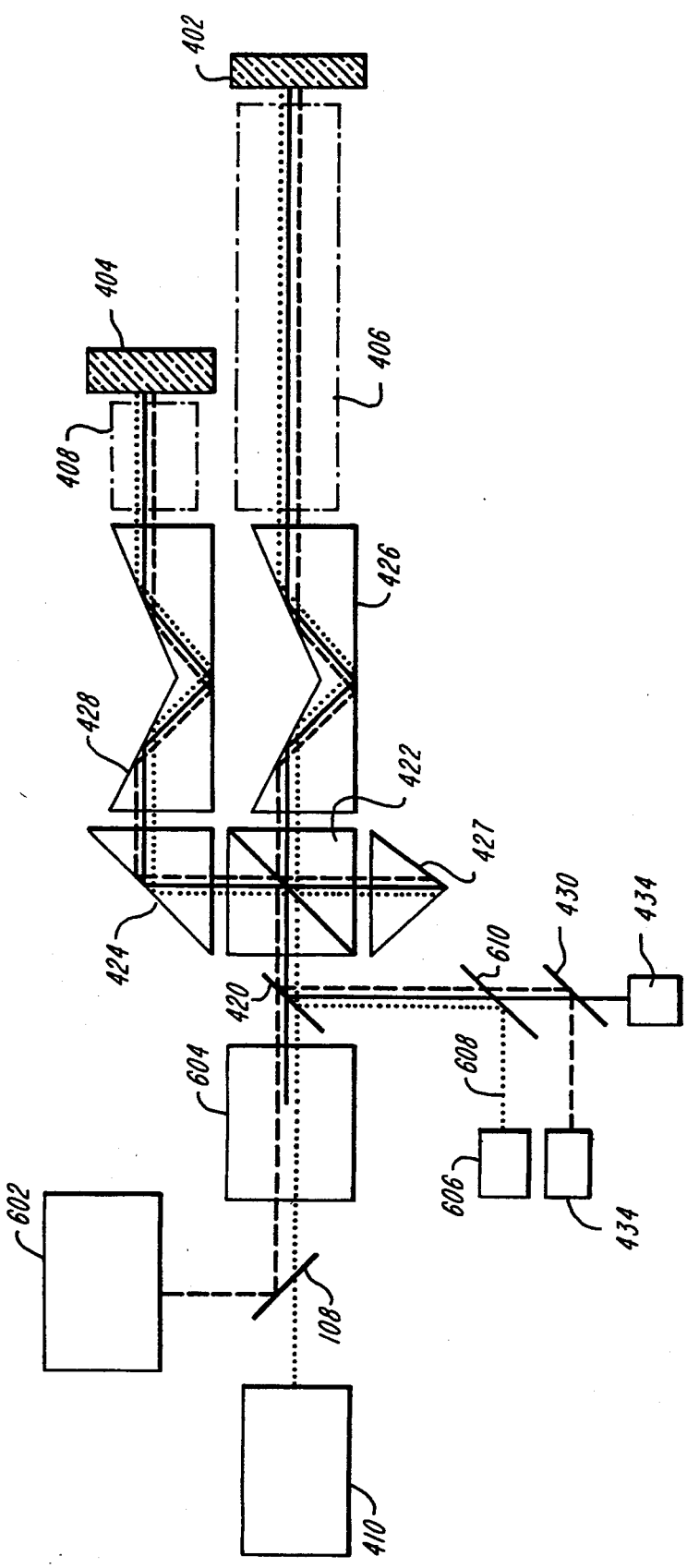
FIG. 9 is a schematic diagram of an interferometer incorporating an air turbulence compensation network which uses two heterodyne laser sources, of which one is especially stable and the other is frequency doubled.

FIG. 9 is a schematic block diagram depicting another variation 600 of the embodiment 400 of FIG. 7. As illustrated in that figure, the interferometer 600 includes both a second heterodyne laser source 602 and a frequency doubler 604. Since the frequency doubler 604 provides the two well separated beams which perform the atmospheric disturbance detection/compensation, the frequency of the second heterodyne laser need not be well separated from the frequency of the first heterodyne laser. The interferometer 600 also includes an additional heterodyne sensor 606 for receiving the heterodyne beam pair 608 reflected from paths 406 and 408 and coupled through beam splitter 610. One advantage of the system of FIG. 9 is that the sensor 438 need not be used. Another advantage is that the second heterodyne laser 602 need not be highly wavelength stabilized.

Figure 10:
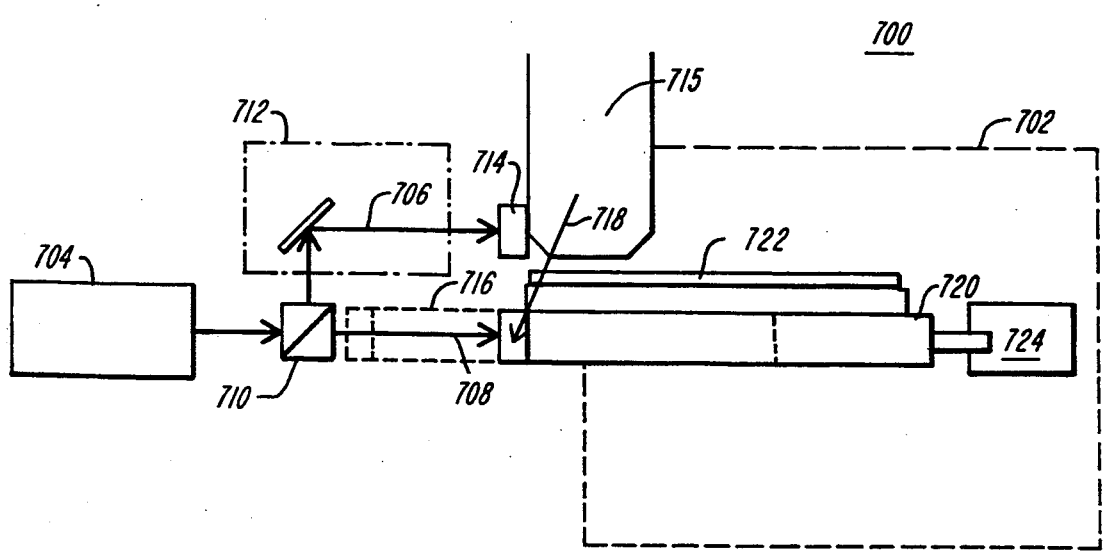
FIG. 10 is a schematic diagram of an interferometer according to the invention incorporated into an apparatus used for integrated circuit fabrication.

FIG. 10 is a schematic block diagram depicting an interferometric system 700, of the type illustrated in FIGS. 1, 7, 8, and 9, adapted for operation with a stepper system 702. The system 700 includes a laser source and sensor 704 for generating a reference beam 706 and a measurement beam 708. The optical network 710 couples the reference beam 706 along a reference path 712 to a stationary reference mirror 714 having an associated reduction lens 715. Similarly, the network 710 couples the measurement beam 708 along a measurement path 716 to a movable measurement mirror 718. The measurements mirror 718 mounts on a movable stage 720, which holds a silicon wafer 722. As indicated the reference path 712 is shielded from environmental turbulence, while the measurement path 716 is left unprotected.

Typically, the interferometric system 700 controls a stage drive servo motor 724 which precisely positions the stage 720. More particularly, a plurality of interferometric measuring devices are employed to provide x-, y-, and z-axial control, along with rotational control of the lithographic stage 703. As with any electrical components, the servo motors and their associated controller electronics generate heat. The heat in turn causes atmospheric disturbances along the optical measurement paths, and if environmentally uncontrolled, the various optical reference paths, in the interferometric position controllers. As discussed above, these disturbances result in positioning errors. Such positioning errors result in circuit registration errors which are intolerable in modern integrated circuit fabrication applications. Since the system 700 can compensate for optical path length variations due to atmospheric disturbance, concurrently with performing the necessary distance measurements to accurately position the stage 720, it can control the positioning of the stage 720 far more accurately than any prior art controllers. Thus, the interferometric system 700 can operate as a key component in a commercial high performance stepper system.

As one skilled in the art will appreciate, the illustrative constructions and design details (including all exemplary part number designations) provided above for a heterodyne interferometric measurement system according to the invention may be modified without departing from the scope of the invention. For example, various approaches can be employed to provide frequency doubling of the laser beams. By further example, several and various interferometer designs can be implemented using a variety of optical components to measure displacements, with single, double, quadruple and more beam paths used to achieve higher accuracy. By further example, enhanced designs of electronic detection systems can be used to measure more accurately position changes. Furthermore, the time dependent positional information can be used to determine the most accurate position by means of advanced computer algorithms.

It is accordingly intended that all matter contained in the above description or shown in the accompanying drawings be interpreted as illustrative rather than in a limiting sense.

It is also intended that the following claims cover all of the generic and specific features of the invention as described herein, and all statements of the scope of the invention which, as a matter of language, might be said to fall therebetween.

Having described the invention, what is claimed as new and secured by Letters Patent is:

1. In an interferometric measuring system including means for projecting a reference light beam at a first measurement wavelength along a reference path to a reference reflector, means for projecting a measurement light beam at a second measurement wavelength along a measurement path to a measurement reflector, and means for determining a change in position of said measurement reflector from an interference pattern produced between a reflected reference beam from said reference reflector and a reflected measurement beam from said measurement reflector, the improvement comprising:
   a laser source including means for projecting a first detection beam at a first detection wavelength along said measurement path, and means for projecting a second detection beam at a second detection wavelength along said measurement path;
   a sensor including means for measuring a phase difference between a first reflected detection beam reflected from said measurement reflector due to said first detection beam and a second reflected detection beam reflected from said measurement reflector due to said second detection beam, wherein said phase difference is indicative of atmospheric disturbances along said measurement path; and
   means for compensating for errors in determining said change in position of said measurement reflector, wherein said errors result at least in part from said atmospheric disturbances.

2. An interferometric measuring system according to claim 1, the further improvement wherein said reference beam and said measurement beam are linearly polarized and coherent.

3. An interferometric measuring system according to claim 2, the further improvement wherein said reference beam has a reference frequency $f_1$ and said measurement beam has a measurement frequency $f_2$, the difference between $f_1$ and said $f_2$ is in the approximate range of 0.5 megahertz to 20 megahertz.

4. An interferometric measuring system according to claim 3, the further improvement wherein said reference beam is orthogonally polarized with respect to said measurement beam of light.

5. An interferometric measuring system according to claim 4, the further improvement wherein said means for determining a change in position of said measurement reflector comprises a detector including means for determining a difference in wavelength between said reference beam and said measurement beam, said difference in wavelength being indicative of said change of position of said measurement reflector.

6. An interferometric measuring system according to claim 1, the further improvement wherein said laser source includes a diode laser for generating said first detection beam, wherein said first detection wavelength is substantially different from both said first measurement wavelength and said second measurement wavelength.

7. An interferometric measuring system according to claim 1, the further improvement wherein said means for projecting said second detection beam includes a first wavelength shifter having means for generating said second detection beam at said second detection wavelength, wherein said second detection wavelength is approximately one half said first detection wavelength.

8. An interferometric measuring system according claim 1, the further improvement wherein said sensor comprises:
   a beam director including means for directing said first reflected detection beam along a first optical path and means for directing said second reflected detection beam along a second optical path;
   a wavelength shifter located in said first optical path and including means for shifting said first detection wavelength to be substantially equal to said second detection wavelength; and
   a photosensitive detector located in said second optical path and coupled to said wavelength shifter and including means for determining a difference in phase angle between said first reflected detection beam and said second reflected detection beam, subsequent to said first reflected detection beam being wavelength shifted.

9. An interferometric measuring system according to claim 8 wherein said first optical path has a nominal first optical path length and said second optical path has a nominal second optical path length, the further improvement wherein said sensor comprises an optical path modulator located in at least one of said first optical path and said second optical path and including means for modulating at least one of said first optical path length and said second optical path length.

10. An interferometric measuring system according to claim 9, the further improvement wherein said optical path modulator includes a piezoelectric device.

11. An interferometric measuring system according to claim 9, the further improvement wherein said beam director includes a wavelength selective beam splitter including means for directing said first reflected detection beam along said first optical path to said optical path modulator and means for directing said second reflected detection beam along said second optical path.

12. An interferometric measuring system according to claim 9, the further improvement wherein said beam director includes a polarization selective beam splitter including means for directing said first reflected detection beam along said first optical path to said optical path modulator and means for directing said second reflected detection beam along said second optical path.

13. An interferometric measuring system according to claim 8 wherein said second detection wavelength is approximately one half said first detection wavelength, the further improvement wherein said wavelength shifter includes means for halving said first detection wavelength to render said first detection wavelength substantially equal to said second detection wavelength.

14. An interferometric measuring system according to claim 8, the further improvement wherein said sensor includes counting means for determining said phase difference from counting optical fringes resulting from an interference pattern produced from combining said first reflected detection beam with said second reflected detection beam, subsequent to said first reflected detection beam being wavelength shifted.

15. An interferometric measuring system according to claim 8, the further improvement wherein said detector includes means for generating an electrical signal indicative of said difference in said phase angle.

16. An interferometric measuring system according to claim 15, the further improvement wherein said electrical signal includes a plurality of harmonic signals, and said sensor includes:
 a first plurality of lock-in amplifiers coupled to said electrical signal and including means for isolating a first set of said harmonic signals, and also including means for generating a first set of output signals indicative of each of said first set of said harmonic signals, and
 processor means for processing said first set of output signals to determine at least a first portion of said difference in said phase angle.

17. An interferometric measuring system according to claim 16, the further improvement wherein said sensor includes:
 a second plurality of lock-in amplifiers coupled to said electrical signal and including means for isolating a second set of said harmonic signals, and including means for generating second set of output signals indicative of said second set of said harmonic signals, and
 a sampling network, coupled to said second set of output signals from said second plurality of lock-in amplifiers, and including means for periodically sampling said second set of output signals, and means for processing said sampled signals to determine a second portion of said difference in said phase angle.

18. In an interferometric measuring system including means for projecting a reference beam at a reference wavelength along a reference path to a reference reflector, means for projecting a measurement beam at a second measurement wavelength along a measurement path to a measurement reflector, and means for determining a first measurement of a change in position of said measurement reflector from an interference pattern produced between reflected reference beam from said reference reflector and reflected measurement beam from said measurement reflector, the improvement comprising:
 a light source including means for projecting a first detection beam at a first detection wavelength along said reference path, and means for projecting a second detection beam at a second detection wavelength along said measurement path;
 a sensor including means for determining a second measurement of said change in position of said measurement reflector from an interference pattern produced between a first reflected detection beam reflected from said reference reflector due to said first detection beam and a second reflected detection beam reflected from said measurement reflector due to said second detection beam; and
 a data processor including means for comparing said first measurement with said second measurement to determine a first error in said first and said second measurements, wherein said first error results from atmospheric disturbances along said measurement path.

19. An interferometric measuring system according to claim 18, the further improvement wherein said data processor includes means for determining a second error in said first and said second measurements, wherein said second error results from atmospheric disturbances along said reference path.

20. An interferometric measuring system according to claim 18, the further improvement wherein said reference beam and said measurement beam are linearly polarized and coherent.

21. An interferometric system according to claim 18, the further improvement wherein said light source includes a wavelength shifter including means for generating said first detection beam having said first detection wavelength approximately equal to one half said reference wavelength and means for generating said second detection beam having said second detection wavelength approximately equal to one half said measurement wavelength.

22. An interferometric measuring system according to claim 18, the further improvement wherein said reference beam is orthogonally polarized with respect to said measurement beam and said first detection beam is orthogonally polarized with respect to said second detection beam.

23. A system for positioning a stage of a lithographic stepper wherein said system includes an interferometer having means for measuring changes in position of said stage along a measurement path, and means for measuring atmospheric disturbances along said measurement path, concurrently with said interferometer measuring said changes in said position.

* * * * *

UNITED STATES PATENT AND TRADEMARK OFFICE
CERTIFICATE OF CORRECTION

PATENT NO. : 5,404,222
DATED : April 4, 1995
INVENTOR(S) : Steven A. Lis

It is certified that error appears in the above-identified patent and that said Letters Patent is hereby corrected as shown below:

At column 4, line 57, please replace "frequency $f_2$" with --frequency $f_1$--;

At column 7, line 55, please replace "outlet" with --output--; and

At column 13, lines 4, 8 and 10, please replace "quaffer" with --quarter--.

Signed and Sealed this

Fifteenth Day of August, 1995

*Attest:*

BRUCE LEHMAN

*Attesting Officer*   *Commissioner of Patents and Trademarks*